United States Patent
Wickramanayake

(10) Patent No.: US 8,287,633 B2
(45) Date of Patent: *Oct. 16, 2012

(54) RESTORATION OF BLACK TO COLOR BLEED PERFORMANCE OF AMPHOTERIC PIGMENT DISPERSION BASED INKS OF LOW PIGMENT LOADS

(75) Inventor: Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1915 days.

This patent is subject to a terminal disclaimer.

(21) Appl. No.: 11/239,728

(22) Filed: Sep. 29, 2005

(65) Prior Publication Data

US 2006/0092252 A1 May 4, 2006

Related U.S. Application Data

(63) Continuation-in-part of application No. 10/975,705, filed on Oct. 28, 2004, now Pat. No. 7,666,256.

(51) Int. Cl.
*C09D 11/02* (2006.01)
(52) U.S. Cl. .................. 106/31.6; 106/31.76
(58) Field of Classification Search .......... 106/31.6, 106/31.75
See application file for complete search history.

(56) References Cited

U.S. PATENT DOCUMENTS

| | | |
|---|---|---|
| 5,554,739 A | 9/1996 | Belmont |
| 5,571,311 A | 11/1996 | Belmont et al. |
| 5,630,868 A | 5/1997 | Belmont et al. |
| 5,707,432 A | 1/1998 | Adams et al. |
| 6,723,783 B2 | 4/2004 | Palumbo et al. |
| 2004/0173120 A1* | 9/2004 | Tsuru et al. ............... 106/31.13 |

FOREIGN PATENT DOCUMENTS

| | | |
|---|---|---|
| EP | 0 559 324 A | 9/1993 |
| EP | 0 924 272 A | 6/1999 |
| EP | 1 088 863 A | 4/2001 |
| EP | 1 491 594 A | 12/2004 |
| JP | 61-183362 A | 1/1987 |
| JP | 04-139272 A | 9/1992 |
| JP | 07-041720 A | 6/1995 |
| JP | 09-143414 A | 6/1997 |
| JP | 9-151348 | 6/1997 |
| JP | 9-183224 | 7/1997 |
| JP | 10-060352 A | 3/1998 |
| JP | 11-172175 | 6/1999 |
| JP | 11-263930 | 9/1999 |
| JP | 2002-155225 | 5/2002 |
| JP | 2002-338860 | 11/2002 |
| JP | 2003-003093 A | 1/2003 |
| JP | 2003-313471 | 11/2003 |
| JP | 2004-155868 | 6/2004 |

OTHER PUBLICATIONS

English machine translation of JP 10-060352.*

* cited by examiner

*Primary Examiner* — Melvin C Mayes
*Assistant Examiner* — Veronica F Faison

(57) ABSTRACT

In one aspect of the present system and method, a pigment-based ink includes an acidic pigment-based ink formulation, and a pigment load less than 5 weight percent, where an amphoteric dispersant maintains the pigment distributed in the acidic pigment-based ink formulation, wherein the amphoteric dispersant has an isoelectric point, and wherein the amphoteric dispersant has a higher isoelectric point than the pH of the acidic pigment-based ink formulation.

21 Claims, 2 Drawing Sheets

RESTORATION OF BLACK TO COLOR BLEED PERFORMANCE OF AMPHOTERIC PIGMENT DISPERSION BASED INKS OF LOW PIGMENT LOADS

RELATED APPLICATIONS

The present application is a continuation-in-part of application Ser. No. 10/975,705, filed on Oct. 28, 2004 now U.S. Pat. No. 7,666,256, which application is incorporated by reference herein in its entirety.

BACKGROUND

The use of inkjet printing systems in offices and homes has grown dramatically in recent years. The growth can be attributed to drastic reductions in cost of inkjet printers and substantial improvements in print resolution and overall print quality. While the print quality has drastically improved, research and development efforts continue toward aligning the permanence of inkjet images with other printing and photographic techniques. A continued demand in inkjet printing has resulted in the need to produce images of high quality, high permanence, and high durability, while maintaining cost effectiveness.

Specifically, when inks of different colors are printed next to each other on bond paper, copier paper, and other media, bleeding could result. Bleeding occurs as colors mix both on the surface of the paper being printed on and in the paper.

In inkjet printing, the inkjet image is formed on a print medium when a precise pattern of dots is ejected from a drop-generating device known as the printhead. The typical inkjet printhead has an array of precisely formed nozzles located on a nozzle plate and attached to an inkjet printhead array. The inkjet printhead array incorporates an array of firing chambers that receive and selectively eject liquid ink, which includes pigments and/or dyes dissolved and/or dispersed in a liquid vehicle, through fluid communication with one or more ink reservoirs. Traditionally, pigment loads of approximately 4 to 5% are used in order to achieve desired performance. Lower loads generally result in enhanced reliability and lower ink costs, but generally are also accompanied by loses in performance with regard to one or more attributes.

SUMMARY

In one aspect of the present system and method, a pigment-based ink includes an acidic pigment-based ink formulation, and a pigment load less than 5 weight percent, where an amphoteric dispersant maintains the pigment distributed in the acidic pigment-based ink formulation, wherein the amphoteric dispersant has an isoelectric point, and wherein the amphoteric dispersant has a higher isoelectric point than the pH of the acidic pigment-based ink formulation.

In another embodiment, a method for forming a pigment-based ink includes amphoterically dispersing a carbon pigment, maintaining the amphoterically dispersed carbon pigment at an acidic pH, and incorporating the amphoterically dispersed carbon pigment into an ink vehicle to form an ink, wherein the amphoterically dispersed carbon pigment forms less than 5 weight percent of the ink.

BRIEF DESCRIPTION OF THE DRAWINGS

The accompanying drawing illustrates various embodiments of the present system and method and is a part of the specification. The illustrated embodiments are merely examples of the present system and method and do not limit the scope thereof.

Throughout the drawings, identical reference numbers designate similar, but not necessarily identical, elements.

DETAILED DESCRIPTION

Figure 1:
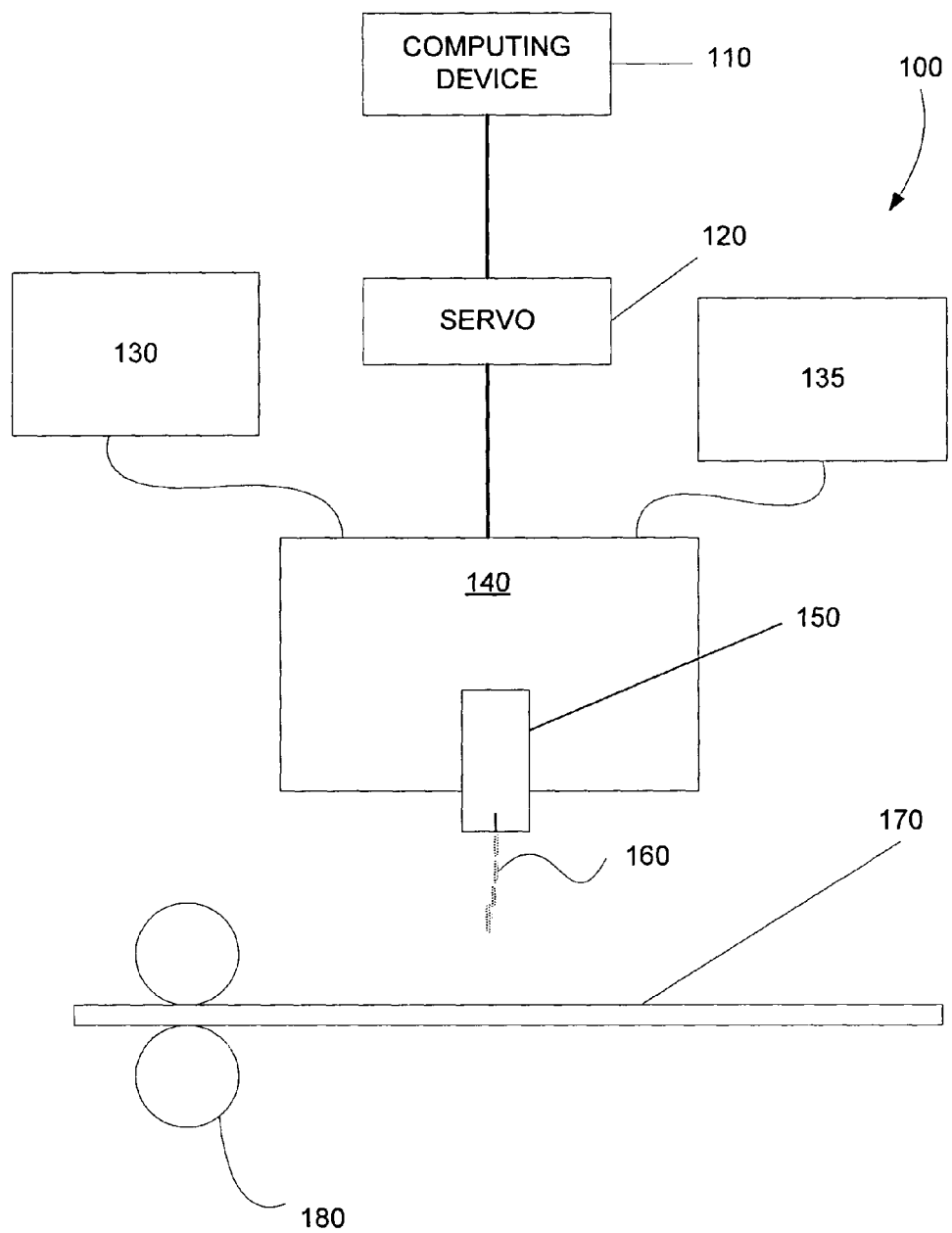
FIG. 1 is a simple block diagram illustrating an inkjet material dispensing system, according to one exemplary embodiment.

The present specification discloses an amphoteric pigment dispersion that exhibits improved black to color bleed performance. According to one exemplary embodiment disclosed herein, the relative cost of the ink is reduced while the reliability is improved by producing a black ink having low pigment concentrations with good optical density and good black to color bleed characteristics. Further details of the present amphoteric pigment dispersion, its formulation, and use thereof will be provided in further detail below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

Additionally, as used herein, and in the appended claims, the term "amphoteric" shall be understood to refer to a substance that is capable of being positively charged under one set of pH conditions, and that is also capable of being negatively charged under different set of pH conditions.

Moreover, as used herein, and in the appended claims, the term "isoelectric point" is meant to be understood as the pH at which a molecule carries no net electrical charge.

Further, as used herein, the phrase "black to color bleed" is meant to be understood as referring to a situation where a black ink is printed next to a colored ink. Often the border between the black ink and the colored ink becomes ragged due to the pigments of the black ink invading into the colored ink space. This invasion of black ink into the colored ink space is referred to as black to color bleed. This is in contradistinction to uses of the term "bleed" in other situations, which often defines "bleed" in the context of ink of a single color following the fibers of the paper.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for producing and using an amphoteric pigment dispersion that exhibits improved black to color bleed performance. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply the present pigment-based inkjet ink (160) to an ink receiving substrate (170), according to one exemplary embodiment. As shown in FIG. 1, the present system includes a computing device (110) controllably coupled through a servo mechanism (120) to a moveable carriage (140) having an inkjet dispenser (150) disposed thereon. As illustrated, a number of material reservoirs (130, 135) are coupled to the moveable carriage (140), and consequently to the inkjet print head (150). A number of rollers (180) may be located adjacent to the inkjet dispenser (150) configured to selectively position an ink receiving substrate (170). The above-mentioned components of the present exemplary system (100) will now be described in further detail below.

The computing device (110) that is controllably coupled to the servo mechanism (120), as shown in FIG. 1, controls the selective deposition of an inkjet ink (160) on an ink receiving substrate (170). A representation of a desired image or text having both black and color components may be formed using a program hosted by the computing device (110). That representation may then be converted into servo instructions that are housed in a processor readable medium (not shown). When accessed by the computing device (110), the instructions housed in the processor readable medium may be used to control the servo mechanisms (120) as well as the movable carriage (140) and inkjet dispenser (150). The computing device (110) illustrated in FIG. 1 may be, but is in no way limited to, a workstation, a personal computer, a laptop, a digital camera, a personal digital assistant (PDA), or any other processor containing device.

The moveable carriage (140) of the present printing system (100) illustrated in FIG. 1 is a moveable material dispenser that may include any number of inkjet material dispensers (150) configured to dispense the inkjet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

FIG. 1 also illustrates the components of the present system that facilitate reception of the pigment-based inkjet ink (160) onto the ink receiving substrate (170). As shown in FIG. 1, a number of positioning rollers (180) may transport and/or positionally secure an ink receiving substrate (170) during a printing operation. Alternatively, any number of belts, rollers, substrates, or other transport devices may be used to transport and/or positionally secure the ink receiving substrate (170) during a printing operation, as is well known in the art.

Further, as an image or text is printed on the ink receiving substrate (170), the computing device (110) may controllably position the moveable carriage (140) and direct one or more of the inkjet dispenser(s) (150) to selectively dispense an inkjet ink at predetermined locations on the ink receiving substrate (170) as digitally addressed drops, thereby forming the desired image or text. The inkjet material dispenser(s) (150) used by the present printing system (100) may be any type of inkjet dispenser(s) configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

The material reservoirs (130, 135) that are fluidly coupled to the inkjet material dispenser(s) (150) house and supply various inkjet inks (160) to the inkjet material dispenser(s). The material reservoir may be any container configured to hermetically seal the pigment-based inkjet ink (160) prior to printing. According to one exemplary embodiment, a first material reservoir (130) contains a black acidic amphoterically dispersed pigment ink. Further, according to the present exemplary embodiment, the second material reservoir (135) contains an anionic color ink. While FIG. 1 illustrates both the first material reservoir (130) and the second material reservoir (135) supplying ink to the same inkjet material dispenser (150), each of the material reservoirs (130, 135) may independently supply ink to separate inkjet material dispensers, according to one exemplary embodiment. Further details of the formulation and use of the black acidic amphoterically dispersed pigment ink and the associated anionic color ink will be provided below.

Exemplary Compositions

Amphoterically Dispersed Pigment Ink

According to one exemplary embodiment, the black acidic amphoterically dispersed pigment ink of the present exemplary system and method may include, but is in no way limited to, a pigment-based ink in which the pigment is dispersed with an amphoteric dispersant. According to one exemplary embodiment, the amphoteric pigment ink is acidic (having a net positive charge on the dispersant). Additionally, according to one exemplary embodiment, the amphoterically dispersed pigment ink may include a vehicle, a solvent, a salt, a buffer, a biocide, a surfactant, and/or combinations thereof. Each of the above-mentioned components will be described in further detail below.

As mentioned above, the amphoterically dispersed pigment ink formulation includes, but is not limited to, a pigment-based ink containing a pigment dispersed with an amphoteric dispersant. According to one exemplary embodiment, the pigment of the amphoterically dispersed pigment ink formulation can include, but is not limited to, black self-dispersed pigments.

More specifically, the base carbon of the self-dispersed black pigment can be almost any commercially available carbon pigment that provides acceptable optical density and print characteristics. Base carbon pigments suitable for use in the present system and method include, but are in no way limited to, carbon black, graphite, vitreous carbon, charcoal, and combinations thereof. In one aspect of the present system and method, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, but are in no way limited to, Cabot pigments such as MONARCH 1400, MONARCH 1300, MONARCH 1100, MONARCH 1000, MONARCH 900, MONARCH 880, MONARCH 800, MONARCH 700; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont.

According to one exemplary embodiment, the present black self-dispersed pigments and methods of attaching functionalized groups are described in U.S. Pat. Nos. 5,707,432; 5,630,868; 5,571,311; 5,554,739, and 6,723,783, all of which are incorporated herein by reference. Specifically, by way of example only, the black pigment can include, but is not limited to, pigments from Cabot: Monarch® 1400, Monarch® 1300, Monarch® 1100, Monarch® 1000, Monarch® 900, Monarch® 880, Monarch® 800, and Monarch® 700. According to one exemplary embodiment, the pigment-based ink can include very low levels of pigment. More specifically, according to one exemplary embodiment, the present pigment-based ink can include an amount of pigment varying from approximately 0.5 to 3 weight percent of the pigment-based ink formulation. More specifically, according to one exemplary embodiment, the present pigment-based ink can include approximately 2 to 3 weight percent pigment without experiencing significant optical density degradation and improving color bleed performance.

According to the present exemplary embodiment, an amphoteric dispersant is coupled to the above-mentioned black pigments. In general, amphoteric dispersants include compounds such as, but not limited to, compounds containing protonizable groups and ionizable acid groups. The appropriate selection of the protonizable and ionizable acid groups and the ratio of those groups can be selected to obtain desired properties of the dispersant. According to the present exemplary embodiment, the amphoteric dispersant comprises ionizable acid groups contributing to isoelectric points higher than the pH of the acidic pigment-based ink formulation. As used herein, the isoelectric point is a characteristic of the dispersant, and is determined by the groups and the ratio of protonizable and/or the ionizable acid groups on the dispersant. Amino acids are one exemplary class of compounds that can be used as dispersants. In particular, appropriate amino acids include, but are in no way limited to, arginine, and the reaction of succinic anhydride with polyethylenimine (PEI). In addition, a protonizable group(s) containing compound and an ionizable acid group(s) containing compound may be separately used in appropriate proportions to disperse a pigment.

According to one exemplary embodiment, the amphoterically dispersed pigment may be present in the present exemplary pigment ink formulation in an amount from about 0.5 to 5 weight percent of the pigment-based ink formulation, from about 1 to 5 weight percent of the pigment-based ink formulation, and from about 2 to 4 weight percent of the pigment-based ink formulation.

As mentioned previously, the present pigment-based ink formulation is acidic at a pH of approximately 3 to 6.5. More specifically, according to one exemplary embodiment, the pH of the present pigment-based ink formulation is maintained at an acidic pH of approximately 4 to 6. Additionally, according to the present exemplary embodiment, the amphoteric dispersant has an isoelectric point higher than the acidic pH of the pigment-based ink, allowing the present self-dispersed pigment-based ink to be stable.

Additionally, according to one exemplary embodiment, the pigment-based ink formulation includes a vehicle. The vehicle, according to one exemplary embodiment is compatible with the amphoteric dispersant and at least sufficient vehicle is used in order to solubilize or disperse components of the pigment-based ink formulation, while providing good inkjettability properties, thereby meeting desired functional performance and characteristics. The vehicle can include any number of vehicle compounds including, but in no way limited to, water, organic solvents, and combinations thereof.

More specifically, according to one exemplary embodiment, the organic solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to ethoxylated glycerol; 2-methyl-1,3-propanediol; 2-methyl 2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5 diol; trimethylol propane, 3-hexnye-2,5-diol; sulfolane, 3-pyridyl carbinol; and other pyridine derivatives. In addition, the solvents can impart desired characteristics to the present pigment-based ink. More particularly, the solvents can be added to reduce the rate of evaporation of water in the ink-jet to minimize clogging or other properties of the ink such as viscosity, pH, surface tension, optical density, and print quality.

Further, various biocides can be used to inhibit growth of undesirable microorganisms in the present black pigment ink. According to one exemplary embodiment, the biocide used in the present black pigment ink is selected to be compatible with the dispersion under acidic conditions.

The non-ionic surfactant that may be included in the present pigment ink formulation may include, but is in no way limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, alkanolamine condensates, alkanolamides, tertiary acetylenic glycols, polyoxyethylenated silicones, N-alkylprrolidones, and alkylpolyglycosides.

All ionic ingredients of the vehicle such as surfactants, biocides, buffers, and other additives are selected so they carry like charges to that of the colorant in the pH range selected. Otherwise, undesired interactions resulting in unstable inks may result.

Figure 2:
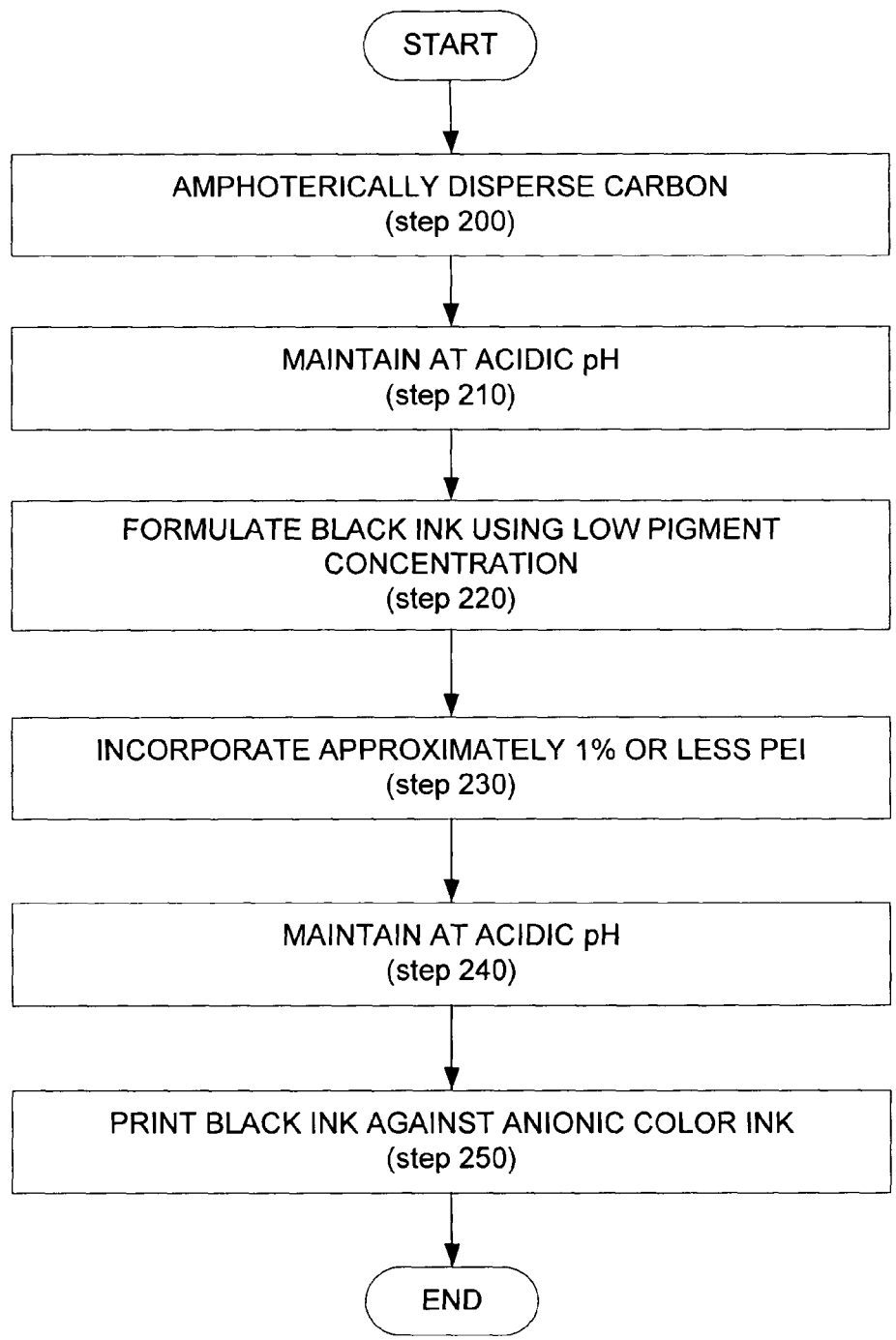
FIG. 2 is a flow chart illustrating a method of forming the present pigment-based black ink and printing it against a dye based ink, according to one exemplary embodiment.

FIG. 2 illustrates a method for forming and using the above-mentioned black amphoterically dispersed pigment ink, according to one exemplary embodiment. As illustrated in FIG. 2, the exemplary formation method begins by first amphoterically dispersing the above identified pigment (step 200). As mentioned, the amphoteric dispersant may be coupled to the above-mentioned black pigment by any number of known methods for attaching functionalized groups to pigments.

As the identified pigments are amphoterically dispersed (step 200), the pigments are maintained at an acidic pH (step 210). According to one exemplary embodiment, the pigment dispersion may be maintained at an acidic pH by the addition of any number of acidic pH adjustors including, but in no way limited to, nitric acid, hydrochloric acid, and sulfuric acid.

Once the black acidic amphoterically dispersed pigments are formed, they are combined with a number of other materials to formulate a black ink having a low pigment concentration (step 220). As mentioned previously, the black ink having a low pigment concentration may include a vehicle, a solvent, a salt, a buffer, a biocide, a surfactant, and/or combinations thereof. Additionally, the black acidic amphoterically dispersed pigments may be present in the resulting ink at relatively low concentrations. For example, according to one exemplary embodiment, the pigment may be present in concentrations between approximately 0.5 and 3.5 weight percent of the resulting ink.

In addition to the above-mentioned materials, less than approximately 1 weight percent of a cationic resin may also be included in the black ink (step 230). According to one exemplary embodiment, the cationic resin may include, but is in no way limited to ethylenimine polymers, diallylamine polymers, and the like. Specifically, according to one exemplary embodiment, the cationic resin included in the pigment black ink may include polyethylenimine (PEI).

In addition to the cationic resin, any number of the above-mentioned acidic pH adjustors may be added to the black ink to maintain an acidic pH (step 240). According to this exemplary embodiment, the pH of the black ink may be maintained in an acidic state to assure that the amphoterically dispersed pigments remain stably distributed within the solution.

When the acidic amphoterically dispersed black pigment-based ink is formed, the ink may then be printed against an anionic color ink (step 250). Exemplary formulations of the anionic color inks are described in detail below.

Anionic Color Ink

As mentioned, the second material reservoir (135) may include, but is in no way limited to, anionic dye-based inks and/or anionic pigment-based inks. In general, dye-based inks and pigment-based inks for use in ink-jet printing can be employed in the practice of the present exemplary system and method. The color inks can include a large number of water-soluble acid and direct dyes. For the purposes of clarification only, and not for limitation, some exemplary colorants suitable for this purpose are set forth below. The color of the anionic color ink formulation can include, but is not limited to, blue, black, brown, cyan, green, white, violet, magenta, red, orange, yellow, as well as mixtures thereof.

According to one exemplary embodiment, the pigments incorporated in the color ink formulation can include, but are not limited to, pigments from BASF: Paliogen® Orange, Heliogen® Blue L 6901F, Heliogen® Blue NBD 7010, Heliogen® Blue K 7090, Heliogen® Blue L 7101 F, Paliogen® Blue L 6470, Heliogen® Green K 8683, and Heliogen® Green L 9140; pigments from Ciba-Geigy: Chromophtal® Yellow 3G, Chromophtal® Yellow GR, Chromophtal® Yellow 8G, Irgrazin® Yellow 5GT, Irgralite® Rubine 4BL, Monastral® Magenta, Monastral® Scarlet, Monastral® Violet R, Monastral® Red B, and Monastral® Violet Maroon B; pigments from Degussa: Printex U, Printex V, Printex 140U, and Printex 140V; pigments from DuPont: Tipure® R-101; pigments from Heubach: Dalamar® Yellow YT-858-D and Heucophthal® Blue G XBT-583D; pigments from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B; pigments from Mobay: Quindo® Magenta, Indofast® Brilliant Scarlet, Quindo® Red R6700, Quindo® Red R6713, and Indofast® Violet; and pigments from Sun Chem: L74-1357 Yellow, L75-1331 Yellow, and L75-2577 Yellow.

Similarly, if the second material reservoir (135; FIG. 1) incorporates an aqueous color dye, the aqueous color dyes can include, but are not limited to, sulfonate and carboxylate dyes, specifically, those that are commonly employed in ink jet printing. Specific examples include, but are in no way limited to, Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine 0, Azure B, Azure B Eosinate, Basic Blue 47, Basic Blue 66, Thioflacin T (Basic Yellow 1), and Auramine 0 (Basic Yellow 2), all available from Aldrich Chemical Company.

Moreover, the colored ink contained in the second material reservoir (135; FIG. 1) may include a vehicle, a solvent, a salt, a buffer, a biocide, a surfactant, and/or combinations thereof. As used herein, the solvent incorporated by the anionic color ink may include, but is not limited to, water soluble organic solvents. The water soluble organic solvents can include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones.

According to one exemplary embodiment, the solvent can include, but is not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol)alkyl ethers, lactams, substituted formamides, unsubstituted formamides, substituted acetamides, and unsubstituted acetamides.

In particular, the solvent can include, but is not limited to, ethoxylated glycerol; 2-methyl-1,3-propanediol; 2-methyl 2,4-pentanediol; 1,5-pentanediol; 2-pyrrolidone; 1-(2-hydroxylethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5 diol; trimethylol propane, 3-hexnye-2,5-diol; sulfolane, 3-pyridyl carbinol; and other pyridine derivatives. In addition, the solvents can be added to reduce the rate of evaporation of water in the ink-jet to minimize clogging or other properties of the ink such as viscosity, pH, surface tension, optical density, and print quality.

Additionally, if biocides are incorporated in the anionic colored ink, the biocides can include, but are not limited to, benzoate salts, sorbate salts, commercial products such as NUOSEPT (Nudex, Inc., a division of Huls America), UCARCIDE (Union Carbide), VANCIDE (RT Vanderbilt Co.), PROXEL (ICI Americas), and other biocides.

Similarly, the non-ionic surfactant can include, but is not limited to, alkylphenol ethoxylates, polyoxyethylenates, straight chain alcohols ethoxylates, polyoxyethylenated polyoxypropylene glycols, polyoxyethylenated mercaptans, long chain carboxylic acid esters, glyceryl and polyglyceryl esters of natural and fatty acids, propylene glycol, sorbitol and polyoxyethylenated sorbitol esters, polyoxyethylene glycol esters and polyoxyethylenated fatty acids, alkanolamine condensates, alkanolamides, tertiary acetylenic glycols, polyoxyethylenated silicones, N-alkylprrolidones, and alkylpolyglycosides.

It should be noted that the ionic ingredients of the vehicle such as surfactants, biocides, buffers, and other additives, are selected so that they carry like charges to that of the anionic colorant in the pH range selected. Otherwise, undesired interactions resulting in unstable inks could result.

As mentioned previously, the colored ink contained in the second ink reservoir (135) has a basic pH, according to one exemplary embodiment. According to this exemplary embodiment, the colored ink is alkaline at a pH of about 7.5 to 10, and about 7.5 to 9.

Returning again to FIG. 2, the acidic amphoterically dispersed black pigment-based ink may be printed against an anionic color ink (step 250). More particularly, when printed against an anionic color ink, the acidic pigment-based ink formulation is at a pH opposite to that of the anionic color ink. Consequently, once the two formulations are disposed adjacent one another, the amphoteric dispersant is attracted to the colorant of the other ink formulation at the boundary, due to their opposite charges. As the two formulations are attracted, the amphoteric dispersant either reaches or approaches its isoelectric point. That is, as the two formulations come together, the pH at the boundary approaches an intermediate pH that is near the isoelectric point of the amphoteric dispersant. As the isoelectric point of the amphoteric dispersant is approached (e.g., about one pH unit prior to the isoelectric point) the black pigment dispersed with the amphoteric dispersant becomes unstable and falls out of solution, also known as "crashing out." As the pigment crashes out or is no longer charge stabilized in solution, it is not as mobile as when originally dispersed. Consequently, black to color bleed is arrested at the interface between the two inks.

In addition to the above-mentioned black to color bleed arrest mechanism, high optical densities can be achieved when using pigment-based ink formulation having the amphoteric dispersants relative to formulations that do not use amphoteric dispersants. Specifically, ink formulations having reduced amounts of pigment, as illustrated above, have shown little to no optical density decrease, compared to the optical density of formulations having higher pigment qualities. As a result, the amphoterically dispersed pigment-based ink formulation can include a relatively lower amount of pigment than conventional dispersant pigment ink formulations, thereby reducing ink production costs, and increasing printhead reliability. According to one exemplary embodiment, the pigment may be as low as 2 weight percent of the pigment-based ink without exhibiting a decrease in optical density.

EXAMPLE

According to a first exemplary embodiment, an amphoteric dispersion was formulated into two inks at a pigment load of approximately 3.5%. Additionally, according to the teachings of the present exemplary system and method, the tested dispersions were maintained at an acidic pH such that the dispersions were cationic. As tested, the control ink contained no amphoteric dispersant having an isoelectric point, while the test ink contained a concentration of between approximately 0.1 and 2 weight % polyethylenimine (PEI) serving as an amphoteric dispersant having an isoelectric point.

Once produced, both inks were bleed tested against two dye based color inks (KR6 and KR8). According to the bleed test, bleed was quantified on a unit-less linear scale ranging from 15 to 30, a score of 30 indicating not good bleed resistance, a score of 25 indicating a good bleed resistance, a score of 20 indicating very good bleed resistance, and a score of 15 indicating excellent bleed resistance characteristics. The bleed scores of the test ink and the control ink, when printed against the two dye based color inks are presented in Table 1 below.

TABLE 1

|  | Control ink (no PEI 600) | Test ink (contains 1% PEI 600) |
| --- | --- | --- |
| KR6 | 24 | 18 |
| KR8 | 19 | 14 |

As illustrated above in Table 1, the test ink containing the amphoteric dispersant having an isoelectric point, exhibited very good and excellent bleed resistance when printed against the two dye based color inks KR6 and KR8 respectively. Further, as illustrated, the test ink containing the amphoteric dispersant having an isoelectric point exhibited significantly better bleed performance than the control ink.

In conclusion, the above-mentioned example illustrates a number of benefits that may be provided by the present exemplary system and method, according to one exemplary embodiment. More specifically, the disclosed black pigmented ink formulations and methods improve black to color bleed performance, allow for a reduction in the quantity of pigments in the black ink, and maintain optical density quality.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An inkjet ink set, comprising:
   an acidic pigment-based ink formulation, said pigment-based ink formulation including a pigment in a concentration of between approximately 0.5 and 5.0 weight percent of said pigment-based ink, and an amphoteric dispersant coupled to said pigment, said amphoteric dispersant having an isoelectric point; and
   an alkaline color ink formulation, wherein said isoelectric point of said amphoteric dispersant is between a pH of said acidic pigment-based ink and a pH of said alkaline color ink.

2. The inkjet ink set of claim 1, wherein said acidic pigment-based ink formulation includes polyethylenimine (PEI) at a concentration of between approximately 0.1 and 2.0 weight %.

3. The inkjet set of claim 1, wherein said amphoteric dispersant is selected from compounds containing protonizable groups and ionizable acid groups.

4. The inkjet set of claim 1, wherein said amphoteric dispersant comprises between approximately 0.01 and 8.0 weight percent of said pigment-based ink formulation.

5. The inkjet ink set of claim 1, further comprising a vehicle selected from water and organic solvents.

6. The inkjet ink set of claim 1, wherein said acidic pigment-based ink formulation comprises a self-dispersed black pigment.

7. The inkjet ink set of claim 1, wherein said alkaline color ink formulation comprises an ink selected from a pigment-based ink and a dye-based ink.

8. The inkjet ink set of claim 1, wherein:
   said acidic pigment-based ink formulation comprises an acidic pH between approximately 3 and 6.5; and
   said alkaline color ink formulation comprises a basic pH between approximately 7.5 and 10.

9. The inkjet ink set of claim 1, wherein said pigment-based ink formulation is configured to provide an optical density substantially equal to a pigment-based ink having a pigment concentration above 4 weight percent.

10. A pigment-based ink formulation comprising:
    an acidic pigment-based ink, wherein said pigment-based ink includes less than 4 weight percent pigment; and
    an amphoteric dispersant distributed in said pigment-based ink formulation, wherein said amphoteric dispersant is charged, and wherein the amphoteric dispersant is selected from compounds containing protonizable groups and ionizable acid groups, wherein the amphoteric dispersant has an isoelectric point, and wherein the amphoteric dispersant has a higher isoelectric point than a pH of said acidic pigment-based ink.

11. The pigment-based ink formulation of claim 10, further comprising polyethylenimine (PEI), wherein said PEI forms less than 1% of said pigment-based ink formulation.

12. The pigment-based ink formulation of claim 10, wherein said pigment-based ink formulation is configured to provide an optical density substantially equal to a pigment-based ink having a pigment concentration above 4 weight percent.

13. The pigment-based ink formulation of claim 10, wherein said pigment-based ink further comprises a self-dispersed black pigment selected from an oxidizes carbon black and a surface modified carbon black.

14. The pigment-based ink formulation of claim 10, wherein said amphoteric dispersant comprises between approximately 0.01 and 8.0 weight percent of said pigment-based ink formulation.

15. A method of printing, comprising:
    providing a dispensing system including:
       an acidic pigment-based ink formulation, said pigment-based ink formulation including a pigment in a concentration of between approximately 0.5 and 5.0 weight percent of said pigment-based ink and an amphoteric dispersant coupled to said pigment, said amphoteric dispersant having an isoelectric point, and
       an alkaline color ink formulation, wherein said isoelectric point of said amphoteric dispersant is between a pH of said acidic pigment-based ink and a pH of said alkaline color ink;
    dispensing said alkaline color ink formulation onto an ink receiving medium;
    dispensing said acidic pigment-based ink formulation adjacent to said dispensed alkaline color ink formulation;
    wherein said acidic pigment-based ink formulation is configured to provide an optical density substantially equal to a pigment-based ink having a pigment concentration above 4 weight percent; and
    wherein an ink bleed between said acidic pigment-based ink formulation and said alkaline color ink formulation is substantially arrested.

16. The method of claim 15, wherein said acidic pigment-based ink formulation further comprises polyethylenimine (PEI) at a concentration of less than approximately 1%.

17. The method of claim 15, wherein said amphoteric dispersant is selected from compounds containing protonizable groups and ionizable acid groups.

18. The method of claim 15, wherein said dispensing alkaline color ink formulation comprises selectively ejecting said alkaline color ink formulation from an inkjet material dispenser onto said ink receiving medium.

19. The method of claim 15, wherein said dispensing said acidic pigment-based ink formulation comprises selectively ejecting said acidic pigment-based ink formulation from an inkjet material dispenser.

20. A printer system comprising:
    an inkjet material dispenser;
    a first ink reservoir fluidly coupled to said inkjet material dispenser, said first ink reservoir containing an acidic pigment-based ink formulation, said pigment-based ink formulation including a pigment in a concentration of between approximately 0.5 and 5.0 weight percent of said pigment-based ink formulation and an amphoteric dispersant coupled to said pigment, said amphoteric dispersant having an isoelectric point; and
    a second ink reservoir fluidly coupled to said inkjet material dispenser, said second ink reservoir containing an alkaline color ink formulation, wherein said isoelectric point of said amphoteric dispersant is between a pH of said acidic pigment-based ink and a pH of said alkaline color ink.

21. The printer system of claim 20, wherein said inkjet material dispenser comprises one of a thermally actuated inkjet dispenser, a mechanically actuated inkjet dispenser, an electrostatically actuated inkjet dispenser, a magnetically actuated dispenser, a piezoelectrically actuated dispenser, or a continuous inkjet dispenser.

* * * * *

UNITED STATES PATENT AND TRADEMARK OFFICE
CERTIFICATE OF CORRECTION

PATENT NO. : 8,287,633 B2
APPLICATION NO. : 11/239728
DATED : October 16, 2012
INVENTOR(S) : Palitha Wickramanayake et al.

Page 1 of 1

It is certified that error appears in the above-identified patent and that said Letters Patent is hereby corrected as shown below:

In column 11, line 63, in Claim 13, delete "oxidizes" and insert -- oxidized --, therefor.

Signed and Sealed this
Nineteenth Day of March, 2013

Teresa Stanek Rea
*Acting Director of the United States Patent and Trademark Office*